Jan. 13, 1942.  W. E. GARITY ET AL  2,269,813
PHOTOMETER SYSTEM
Filed July 31, 1940  2 Sheets-Sheet 1

WILLIAM E. GARITY
HALLEY WOLFE
INVENTORS

BY
ATTORNEY.

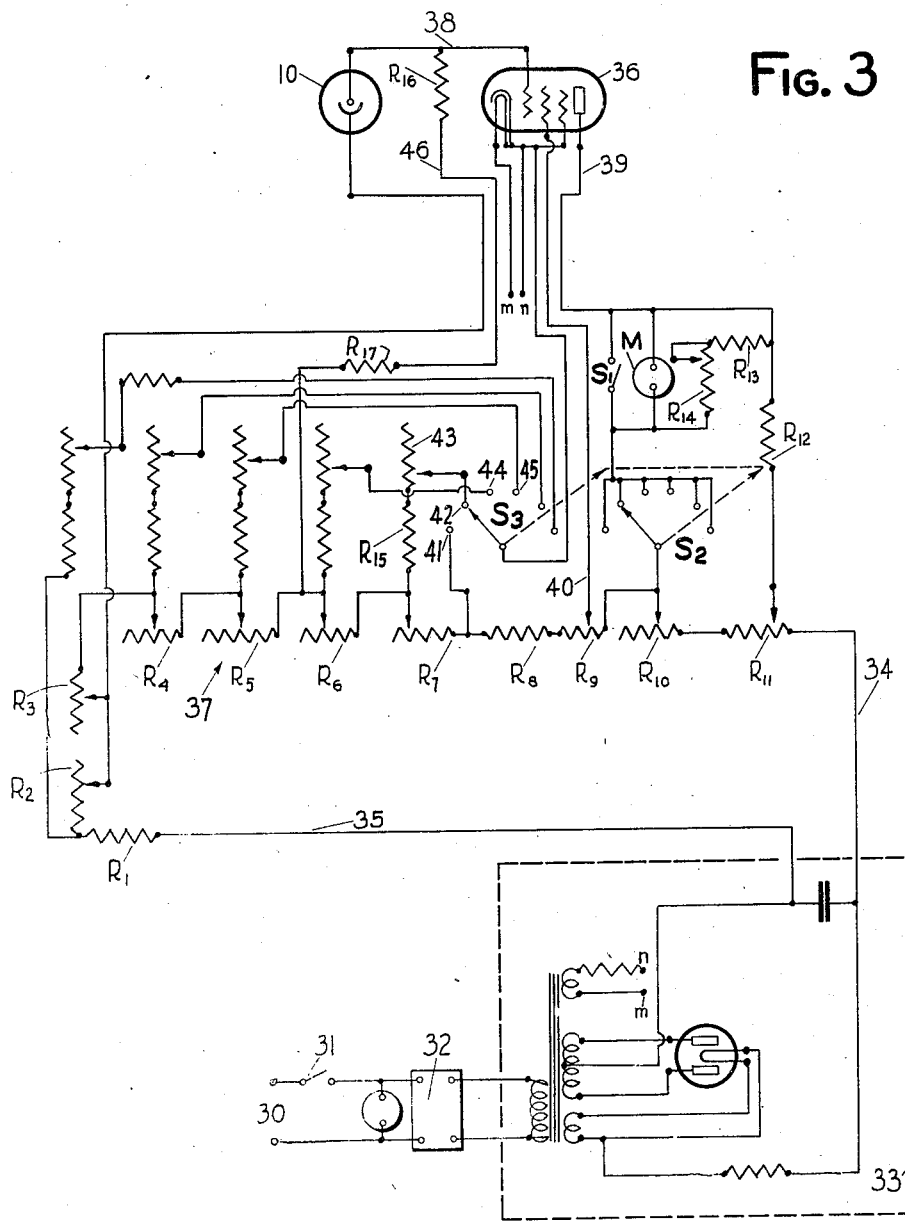

Patented Jan. 13, 1942

2,269,813

UNITED STATES PATENT OFFICE 2,269,813

PHOTOMETER SYSTEM

William E. Garity, Los Angeles, and Halley Wolfe, North Hollywood, Calif., assignors to Walt Disney Productions, Burbank, Calif., a corporation of California Application July 31, 1940, Serial No. 348,614

12 Claims. (Cl. 88—23)

This invention pertains to improvements in devices for determining the luminosity or brightness of a surface or field of view, and is particularly directed to devices and methods whereby the brightness or luminosity of a surface or field may be obtained directly, irrespective of the distance between the instrument and field whose luminosity is being determined, within reasonable limits.

Prior methods of determining luminosity have not been satisfactory because the methods either involved complicated and unwieldy comparison devices or were not selective and therefore could not be used in determining the luminosity of a desired portion or limited area, or simply gave comparative readings which could not be expressed in terms of candles per square foot or other definite unit of illumination.

The present method obviates the difficulties and disadvantages of the prior art and permits readings to be obtained directly in candles per square foot. Moreover, the method of the present invention permits a selected limited area of an object or field to be tested. The ability to obtain such reading on a selected or desired portion of a total surface is of great advantage in photography since a large field of view may be embraced by the camera lens, such field of view having areas differing very materially in luminosity.

An overall or average reading for the entire field of view would be of little avail to the photographer who is primarily interested in obtaining an accurate detailed photographic image of a particular portion of such field. The photographer, therefore, is primarily interested in determining the luminosity of the desired portion only of the field, the remaining portions being considered relatively unimportant as regards perfect development of the final photograph.

The present invention, moreover, is directed toward a stable, portable instrument capable of being employed in various positions and at various distances from the field or object whose luminosity or brightness is to be measured. The device need not be positioned at any fixed or predetermined distance from the object in order to obtain accurate readings.

Generally stated, the device of the present invention depends upon the use of a photoelectric cell operably associated with an amplifier and a measuring circuit. Means are provided for limiting the field or angle of view of the photoelectric device, these means permitting only a predetermined and fixed angle of view whereby light from predetermined areas only may exert effect upon the device. Means are also provided whereby the device may be accurately calibrated and the unit of measurement on the scale of the measuring device changed at will, generally in accordance with the luminosity of the surface or field being tested, so that full effectiveness of the scale of the measuring instrument may be utilized. Means are also provided for preventing overload of the device and in maintaining the electrical circuits in effective operating condition.

An object of the present invention, therefore is to disclose and provide means and methods whereby the brightness or luminosity of any desired portion of an object or field may be readily determined.

A further object is to provide means for measuring the intensity of light on a surface irrespective of changes in the distance of the measuring device from the surface being measured, so long as the surface is large enough to fill the angular field of view of the instrument and has uniform brightness.

A further object is to provide means of reading directly in units of light intensity or luminosity of objects within a particular space angle irrespective of placement of the testing means with regard to the object.

An object of the invention is to provide a light measuring device whose readings are substantially not injured or affected by temperature of surroundings, magnetic fields, or constant or repeated use.

A further object is to provide particular arrangements of elements whereby the various desirable objects of the present invention may be readily attained.

These and other objects, advantages, uses, modifications and adaptations of the invention will become apparent to those skilled in the art from the following detailed description of an exemplary form of the invention and methods of use. In order to facilitate understanding, reference will be had to the appended drawings, in which:

Fig. 3 is an exemplary circuit diagram of the system.

Although the methods and devices of this invention may be used in determining the luminosity or brightness of various surfaces, objects and fields under numerous conditions, particular reference will be had hereafter to the use of the device in photography, specifically the photography of drawings, paintings and the like in the production of animated motion picture cartoon photoplays.

Generally stated in the production of animated cartoon films various pictorial representations are made on transparencies commonly referred to as cells. Each cell carries a pictorial representation of one or more elements. These cells are placed in superimposed relation and photographed. The cells may be spaced one from the other and separately illuminated, generally, but not necessarily, from the camera side. In view of the fact that a large number of cells may be employed and that these cells may be carried upon or covered by additional sheets of transparent material, considerable loss of light reflected from a cell most distant from the camera takes place by absorption and reflection, in passing through other cells and transparent supports between it and the camera lens. For this reason it is important that each of the cells or planes be properly illuminated. If, for example, it is desired that the background drawing (generally farthest removed from the camera) clearly appear in the finished photograph, then the light intensity or luminosity of such background drawing should be appreciably greater than the luminosity of the cells or drawing nearer the camera lens. The method and devices of the present invention are particularly well suited for use in determining and establishing the illumination on each cell and in making certain that the luminosity of a cell is uniform over its entire surface.

Figure 2:
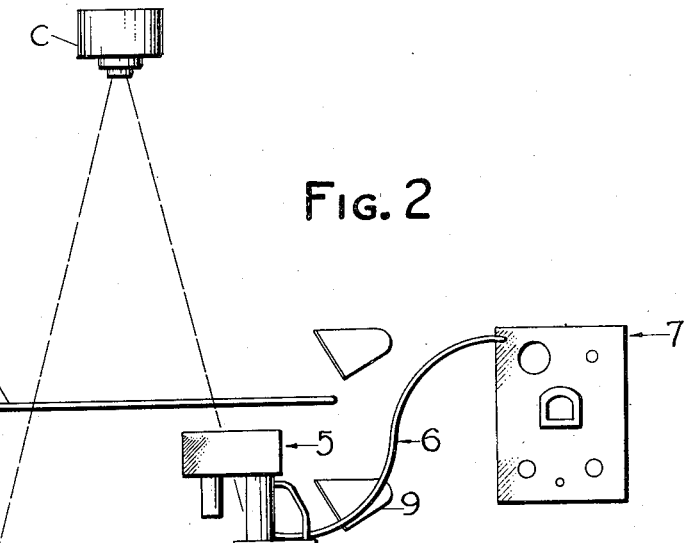
Fig. 2 is a diagrammatic representation of the device and one manner of use.

For example, as shown in Fig. 2 different cells may be positioned in spaced relation within the field of view of a camera C. The cells are indicated at 1, 2, 3 and 4. As shown in the drawings, a portable testing unit is generally indicated at 5 and is shown positioned upon the cell 2. The testing unit is connected as by means of the cable 6 with the measuring device generally indicated at 7. By moving the device 5 over the cell 2, the luminosity of selected areas of the cell may be readily determined and directly observed upon the instrument 7. If it is found that one side of the cell is insufficiently illuminated, the light sources 8 or 9 may be suitably adjusted.

The portable unit 5 may then be moved either up on cell 1 or down upon cell 3 to make additional determinations. Since each cell or plane is provided with independent light sources, the illumination of the various planes may be accurately controlled before photography begins.

The measuring system includes the portable device 5 and the measuring unit 7. Generally stated, the portable device 5 includes a photoelectric cell whereas the measuring device 7 may include suitable amplifiers, measuring circuit, indicating devices, switches, etc. An illustrative circuit is shown in Fig. 3 whereas Fig. 1 is an enlarged sectional view of the portable device 5.

Figure 1:
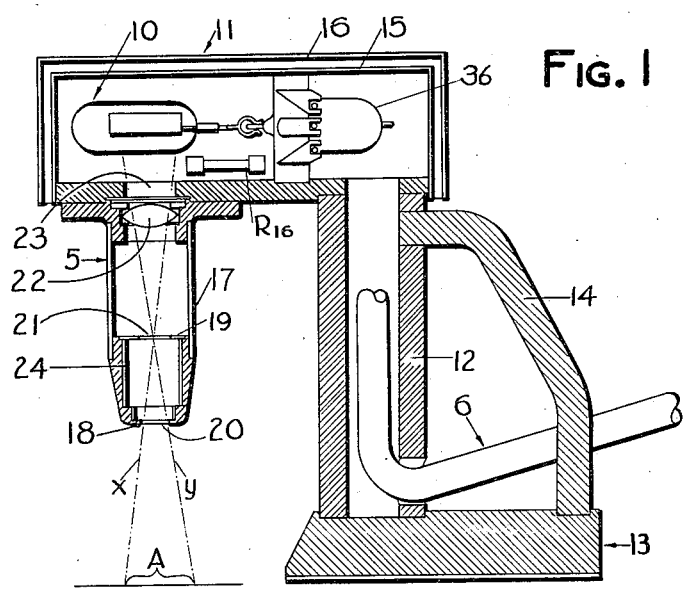
Fig. 1 is an enlarged vertical section of one form of portable unit for use in the methods of this invention.

As shown in Fig. 1, the device 5 may comprise a photoelectric cell 10 positioned within a housing generally indicated at 11, said photoelectric cell being mounted upon a standard 12 supported by a base 13. In the particular form illustrated, the standard 12 is hollow so as to receive the cable 6 and a handle 14 is provided for the purpose of facilitating movement of the entire unit. The housing 11 may be of any suitable type but in order to stabilize the unit and inhibit variations in response in the photoelectric cell 10 due to temperature changes, it has been found desirable to provide a substantially light-absorbing, heat-insulating housing such as, for example, a housing composed of an inner member 15 and an outer spaced wall member 16, the inner opposing surfaces of the walls 15 and 16 being highly polished or plated. The inside surface of the wall member 15 and the exterior surface of the wall member 16 may be made light-absorbing and non-actinic.

Means are provided for limiting the area of view exposed to the photoelectric cell 10 whereby light from a fixed space angle only is admitted to the photoelectric cell. In the form illustrated, the device includes a nose piece 17 carried by the lower side of the housing 11 immediately beneath the photoelectric cell 10, such nose piece including limiting baffles 18 and 19 having ports 20 and 21 respectively. A collecting lens 22 may be positioned in the upper end of the nose piece 17 or in the bottom of the housing 11 for the purpose of positively directing light entering the nose piece onto the cell 10 through the aperture 23 made in the bottom of the housing 11.

The interior of the nose piece 17 may be made non-reflective as, for example, by the use of a black velvet lining indicated at 24 or by the application of suitable black flat paint.

It will be noted that the nose piece 17 and baffles 18 and 19 definitely limit the area of view exposed to the photoelectric cell 10. The limiting lines of view are indicated at $x$ and $y$ and it has been found that in most instances the space angle or the angle between $x$ and $y$ may well vary from about 10 to 25 degrees. In most instances, angles of between about 15 and 20 degrees are entirely satisfactory. When the device is resting upon its base 13 and upon an object whose surface is to be measured, then, as indicated in Fig. 1, only the luminosity of the limited area A embraced by the space angle of the limiting means 17 is recorded by the photoelectric cell 10.

The interrelation of the portable unit 5 with the rest of the system will be evident from a study of Fig. 3. Current from any suitable source is supplied to the measuring instrument contained within a suitable housing 7 as by means of line 30 leading to a power switch 31 and a voltage regulator 32. The voltage regulator is operably connected to a suitable transformer and rectifier, generally embraced by the lines 33 adapted to supply current to the rest of the system through the lines 34 and 35 as well as to the filament of the amplifier tube 36. Conductors to the filament of the tube are not shown in detail but are indicated at $m$ and $n$.

A plurality of resistances in series is connected between the positive and negative potential connections 34 and 35, these resistances constituting a bleeder circuit generally indicated by the numeral 37. Individual resistances are indicated at $R_1$, $R_2$, $R_3$, etc. The photoelectric cell is indicated at 10 and it is to be noted that the cathode of the cell is connected to taps on the bleeder circuit through the variable resistances $R_2$ and $R_3$. The vacuum tube of the amplifier is indicated at 36 and a grid of this tube is connected to the anode of the cell as by line 38. The plate of tube 36 is operably connected by lead 39 to a Wheatstone bridge type, measuring circuit, one leg of which includes resistance $R_{12}$ and the variable resistance $R_{11}$, and another leg of which includes an operable portion of resistance $R_{10}$, and a portion of $R_{11}$. Diagonally across legs of said bridge is a micro-ammeter $M$, the micro-ammeter being electrically associated with the bridge through a switch $S_2$ and a sensitivity control circuit indicated by resistances $R_{13}$ and $R_{14}$. A separate switch $S_1$ may be used for the purpose of shunting the micro-ammeter. Another grid of the tubme 36 (in this case a pentode tube) may be connected as by lead 40 to one of the variable resistances, such as $R_9$.

The cathode of the tube 36 leads to a selector switch $S_3$ which is capable of connecting the cathode with any one of a plurality of separately operable circuits connected to various parts of the bleeder circuit 37. Each of these separately operable cathode or feedback circuits may include a variable resistance. For example, the switch $S_3$ may connect contact 41 directly with the bleeder circuit between resistances $R_7$ and $R_8$. Contact 42 may lead to a variable resistance 43 and a fixed resistance $R_{15}$ electrically associated with the operable portion of the variable resistance $R_7$ of the bleeder circuit. Additional circuits are connected to contacts 44, 45, etc., of the switch $S_3$.

Means are provided for maintaining a desired polarizing voltage on the photoelectric cell 16 and such means include the line 46 including suitable resistances $R_{16}$ and $R_{17}$ connecting the line 36 with the bleeder circuit.

The selector switch $S_3$ and the switch $S_2$ are mechanically coupled together so that the circuit to micro-ammeter $M$ is broken whenever the cathode circuit is broken by the switch $S_3$. Switch $S_2$ operating in this manner gives some additional protection but it is not necessary for satisfactory operation.

The various circuits connected to the taps 41 to 45 of the selector switch $S_3$ permit a selection in operative ranges of the device and accurate control within such ranges by the variable feed back resistors embodied in the cathode circuits. In the device shown in Fig. 1 and diagrammatically represented in Fig. 3, the vacuum tube 36 is positioned in the portable device. It is to be understood that the vacuum tube 36 need not be carried in the portable device, but instead may be a part of the bulkier portion of the equipment.

In calibration of the device, by one method which has been successfully employed, the nose of the portable device including the photoelectric cell, is directed upon a standard reflecting surface such as that of a magnesium carbonate block illuminated with a standard lamp, the surface of the block being perpendicular to the axis of the lamp. The axis of the nose piece 17 is placed in as perpendicular a position to the plane of the block as it is possible so to do without casting shadows upon the block, in the field of view of the photometer. A fixed bias voltage of approximately $-2$ having been previously determined is a desirable value to use on the tube 36, the resistances $R_6$ and $R_7$ are adjusted so that their sum gives this value of bias when no light is permitted to enter into the nose piece 17. For these adjustments the selector switch $S_3$ is maintained in contact with tap 41. Under such conditions, the micro-ammeter $M$ is caused to read exactly zero by manipulating the variable resistance $R_{11}$, then by positioning the carbonate block and standard light source so as to impart a brightness of 50 candles per square foot on said block, the micro-ammeter $M$ is made to read full scale or 100 microamps by adjusting the variable resistance $R_{14}$ which shunts the meter. The scale of the micro-ammeter can now be calibrated between 0 and 50 candles per square foot.

The selector switch $S_3$ is then moved to tap 42 corresponding to the 100 candle per square foot scale and again with the nose piece of the photo-cell darkened, the bias voltage is adjusted by means of $R_6$ until the micro-ammeter reads zero with substantially no adjustment of $R_{11}$. By increasing the brightness on the magnesium carbonate block to 100 candles per square foot, the reading of the micro-ammeter is noted and the feed back resistance in the circuit connected to tap 42 is adjusted to cause a reading of exactly 100 candles per square foot on the micro-ammeter. After each change of feed back resistance the bias voltage is adjusted as by $R_6$ to give the same no-light plate current. Resistance $R_7$ is now adjusted to make $R_6$ plus $R_7$ the same as its adjustment for the 50 foot candle scale. Similar operations are carried out with the various other cathode circuits so as to provide a plurality of scales on the micro-ammeter ranging from 50 to 5000 candles per square foot, say 50, 100, 250, 500, 1000 and 5000. When all the scales have been adjusted in the manner described, the micro-ammeter will read full scale for each scale setting at the full scale brightness and very little adjustment need be made with the zero or no-light position of the meter in switching from one scale to the other. Great accuracy of readings is obtainable by reason of the numerous scales provided.

In an actual embodiment of the invention using a pentode amplifier tube No. 954 and a No. 922 photoelectric cell, the following values of resistances in the bleeder circuit were employed:

| | Ohms |
|---|---|
| $R_1$ | 2500 |
| $R_2$ | 1250 |
| $R_3$ | 500 |
| $R_4$ | 300 |
| $R_5$ | 250 |
| $R_6$ | 100 |
| $R_7$ | 50 |
| $R_8$ | 2600 |
| $R_9$ | 250 |
| $R_{10}$ | 500 |
| $R_{11}$ | 100 |

The feed back resistances in the circuit connected to tap 42 included a fixed resistance $R_{15}$ of 720 ohms and a variable resistance 43 set at 250 ohms. The corresponding values for the next circuit connected to tap 44 were 2900 and 630 ohms. The following circuit (tap 45) included a fixed resistance of 6000 ohms and a variable resistance set at 1380. The remaining feed back circuits increased at resistances of progressively increasing value of a similar order. Under the specific conditions herein referred to, the shunt resistance $R_{14}$ was set at about 1100 ohms whereas the fixed resistance $R_{13}$ was of 9000 ohms. $R_{12}$ had a value of 20,000 ohms.

The device described herein is of particular value in measuring the uniformity or flatness of lighting for a large area, since the portable device may be moved from one area to another to make certain the illumination thereon is uniform. The nose 17 restricts the light angle to which the photoelectric cell responds and thereby permits accurate measurements to be taken of limited areas throughout a given field. When drawings, titles or the like are to be photographed, the field to be occupied by the drawing, title or the like may be readily measured. In the event the photography is to involve the production of two or more color separation negatives, it has been found desirable to embody light filters in the nose 17 of the device, these light filters being similar to those employed in the camera to be used in taking the color separation negatives. The effect of such light filters upon the luminosity of the field can thus be readily determined.

It is to be understood that the lens 22 may be dispensed with under some conditions, and that numerous other changes can be made in the construction and arrangement of the device. The method of calibration specifically described here has been found effective, but other systems of calibration may also be used.

All changes and modifications coming within the scope of the appended claims are embraced thereby.

We claim:

1. A system for measuring light intensity comprising: a photoelectric cell having an anode and a cathode, and a measuring circuit operably connected to said photoelectric cell and including a vacuum amplifier tube including a plate and a cathode, a high voltage connection to said plate, a low voltage connection to said cathode, a current-measuring device operably connected in the plate circuit of said tube, a plurality of separately variable resistances in series connected between the high and low voltage connections for the tube, said resistances constituting a bleeder circuit, a plurality of separate variable resistances in the cathode circuit and between said tube and variable points on the bleeder circuit, a selector switch adapted to selectively connect a cathode of said tube with a selected cathode resistance, a switch in the circuit of said current-measuring device, said switch being mechanically coupled with said selector switch to break the circuit to the measuring device upon breaking of the cathode circuit and to prevent overload of said current-measuring device, a fixed connection including a resistance between the bleeder circuit and the grid of said tube and the anode of the photoelectric cell to maintain a fixed voltage or potential on the grid and anode when no light enters said photoelectric cell and a connection between the cathode of the photoelectric cell and a variable resistance in the bleeder circuit adapted to maintain a desired polarizing voltage on said photoelectric cell.

2. A system for measuring a light intensity comprising: a portable unit including a photoelectric cell having an anode and a cathode, a ventilated light-absorbing and heat-insulating housing for the photoelectric cell, means for limiting the area of view exposed to said photoelectric cell, said means being carried by the housing, and a measuring circuit operably connected to said photoelectric cell and including a vacuum amplifier tube including a plate and a cathode, a high voltage connection to said plate, a low voltage connection to said cathode, a current-measuring device operably connected in the plate circuit of said tube, a plurality of separately variable resistances in series connected between the high and low voltage connections for the tube, said resistances constituting a bleeder circuit, a plurality of separate variable resistances in the cathode circuit and between said tube and variable points on the bleeder circuit, a selector switch adapted to selectively connect a cathode of said tube with a selected cathode resistance, a switch in the circuit of said current-measuring device said switch being mechanically coupled with said selector switch to break the circuit to the measuring device upon breaking of the cathode circuit and to prevent overload of said current-measuring device, a fixed connection including a resistance between the bleeder circuit and the grid of said tube and the anode of the photoelectric cell to maintain a fixed voltage or potential on the grid and anode, and a connection between the cathode of the photoelectric cell and a variable resistance in the bleeder circuit adapted to maintain a desired polarizing voltage of between about 15 and 30 volts on said photoelectric cell.

3. A system for measuring light intensity comprising: a source of current; a plurality of resistances in series connected across the source of current, said resistances comprising a bleeder circuit; a photoelectric cell; a measuring circuit operably connected to the photoelectric cell and to the current supply, said measuring circuit including an amplifier tube having a plate and a cathode; a switch in the measuring circuit; a plurality of separate cathode circuits connected to various parts of said bleeder circuit; and a selector switch connected to the cathode of said tube and adapted to connect the same with any one of said cathode circuits.

4. A system for measuring light intensity comprising: a source of current; a plurality of resistances in series connected across the source of current, said resistances comprising a bleeder circuit; a photoelectric cell; a measuring circuit operably connected to the photoelectric cell and to the current supply, said measuring circuit including an amplifier tube having a plate and a cathode; a switch in the measuring circuit; a plurality of separate cathode circuits connected to various parts of said bleeder circuit; and a selector switch connected to the cathode of said tube and adapted to connect the same with any one of said cathode circuits, said selector switch and measuring circuit switch being mechanically coupled together to open simultaneously.

5. A system for measuring light intensity comprising: a source of current; a plurality of resistances in series connected across the source of current, said resistances comprising a bleeder circuit, a part at least of said resistances being separately variable; a photoelectric cell, a measuring circuit operably connected to the photoelectric cell and to the current supply, said measuring circuit including an amplifier tube having a plate and a cathode; a switch in the measuring circuit; a plurality of separate cathode circuits connected to various parts of said bleeder circuits; and a selector switch connected to the cathode of said tube and adapted to connect the same with any one of said cathode circuits.

6. A system for measuring light intensity comprising: a source of current; a plurality of resistances in series connected across the source of current, said resistances comprising a bleeder circuit, a part at least of said resistances being separately variable; a photoelectric cell; a measuring circuit operably connected to the photoelectric cell and to the current supply, said measuring circuit including an amplifier tube having a plate and a cathode; a switch in the measuring circuit; a plurality of separate cathode circuits connected to various parts of said bleeder circuit; and a selector switch connected to the cathode of said tube and adapted to connect the same with any one of said cathode circuits, said selector switch and measuring circuit switch being mechanically coupled together to open simultaneously.

7. A system for measuring light intensity comprising: a source of current; a plurality of resistances in series connected across the source of current, said resistances comprising a bleeder circuit, a part at least of said resistances being separately variable; a photoelectric cell; a measuring circuit operably connected to the photoelectric cell and to the current supply, said measuring circuit including an amplifier tube having a plate and a cathode; a switch in the measuring circuit; a plurality of separate cathode circuits connected to various parts of said bleeder circuit, each of said cathode circuits including a separately variable resistance; and a selector switch connected to the cathode of said tube and adapted to connect the same with any one of said cathode circuits.

8. A system for measuring light intensity comprising: a source of current; a plurality of resistances in series connected across the source of current, said resistances comprising a bleeder circuit, a part at least of said resistances being separately variable; a photoelectric cell; a measuring circuit operably connected to the photoelectric cell and to the current supply, said measuring circuit including an amplifier tube having a plate and a cathode and a bridge circuit including a micro-ammeter; a switch in the measuring circuit; a plurality of separate cathode circuits connected to various parts of said bleeder circuit; and a selector switch connected to the cathode of said tube and adapted to connect the same with any one of said cathode circuits.

9. A system for measuring light intensity comprising: a source of current; a plurality of resistances in series connected across the source of current, said resistances comprising a bleeder circuit, a part at least of said resistances being separately variable; a photoelectric cell; a measuring circuit operably connected to the photoelectric cell and to the current supply, said measuring circuit including an amplifier tube having a plate and a cathode and a bridge circuit including a micro-ammeter; a switch in the measuring circuit; a plurality of separate cathode circuits connected to various parts of said bleeder circuit; and a selector switch connected to the cathode of said tube and adapted to connect the same with any one of said cathode circuits, said selector switch and measuring circuit switch being mechanically coupled together to open simultaneously.

10. A system for measuring light intensity comprising: a source of current; a plurality of resistances in series connected across the source of current, said resistances comprising a bleeder circuit, a part at least of said resistances being separately variable; a photoelectric cell; a measuring circuit operably connected to the photoelectric cell and to the current supply, said measuring circuit including an amplifier tube having a plate and a cathode and a bridge circuit including a micro-ammeter; a switch in the measuring circuit; a plurality of separate cathode circuits connected to various parts of said bleeder circuit, each of said cathode circuits including a separately variable resistance; and a selector switch connected to the cathode of said tube and adapted to connect the same with any one of said cathode circuits, said selector switch and measuring circuit switch being mechanically coupled together to open simultaneously.

11. A device for measuring light intensity or brightness of a field comprising: a portable member provided with a base and a head, a downwardly directed nose piece carried by said head, a photoelectric cell in said head in operative relation to said nose piece, said nose piece being adapted to restrict the entry of light to a predetermined space angle; a source of current; a plurality of resistances in series connected across the source of current, said resistances comprising a bleeder circuit; a measuring circuit operably connected to the photoelectric cell and to the current supply, said measuring circuit including an amplifier tube having a plate and a cathode; a switch in the measuring circuit; a plurality of separate cathode circuits connected to various parts of said bleeder circuit; and a selector switch connected to the cathode of said tube and adapted to connect the same with any one of said cathode circuits.

12. A device for measuring light intensity or brightness of a field comprising: a portable member provided with a base and a head, a downwardly directed nose piece carried by said head, a photoelectric cell in said head in operative relation to said nose piece, said nose piece being adapted to restrict the entry of light to a predetermined space angle; a source of current; a plurality of resistances in series connected across the source of current, said resistances comprising a bleeder circuit; a measuring circuit operably connected to the photoelectric cell and to the current supply, said measuring circuit including an amplifier tube having a plate and a cathode; a switch in the measuring circuit; a plurality of separate cathode circuits connected to various parts of said bleeder circuit; and a selector switch connected to the cathode of said tube and adapted to connect the same with any one of said cathode circuits, said selector switch and measuring circuit switch being mechanically coupled together to open simultaneously.

WILLIAM E. GARITY.
HALLEY WOLFE.